(12) United States Patent
Sripathi et al.

(10) Patent No.: US 10,268,256 B2
(45) Date of Patent: Apr. 23, 2019

(54) TECHNIQUES FOR REDUCING POWER CONSUMPTION BASED AT LEAST IN PART ON RECONFIGURATION OF A USER EQUIPMENT IN A SUB-TRANSMISSION TIME INTERVAL (TTI) RANGE

(71) Applicant: QUALCOMM Incorporated, San Diego, CA (US)

(72) Inventors: Prashant Udupa Sripathi, San Jose, CA (US); Chinmay Vaze, San Diego, CA (US); Hongbo Yan, Vista, CA (US); Raghu Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/683,553

(22) Filed: Aug. 22, 2017

(65) Prior Publication Data

US 2018/0059769 A1    Mar. 1, 2018

Related U.S. Application Data

(60) Provisional application No. 62/378,917, filed on Aug. 24, 2016.

(51) Int. Cl.
     *G06F 1/3225*      (2019.01)
     *H04B 7/26*      (2006.01)
     (Continued)

(52) U.S. Cl.
     CPC .......... *G06F 1/3278* (2013.01); *G06F 1/3225* (2013.01); *H04B 7/2603* (2013.01);
     (Continued)

(58) Field of Classification Search
     CPC ... H04B 7/0426; H04B 7/2603; G06F 1/3203; G06F 1/3278
     (Continued)

(56) References Cited

U.S. PATENT DOCUMENTS 9,655,043 B2    5/2017    Kim et al.
2010/0297932 A1    11/2010    Golshenas et al.
(Continued)

FOREIGN PATENT DOCUMENTS

EP      2224634 A2    9/2010

OTHER PUBLICATIONS

Halak B., et al., "Energy-Efficient Adaptive MIMO Decoders", 2015 Science and Information Conference, IEEE, Jul. 28, 2015, pp. 1140-1143, XP033217457, DOI:10.1109/SAI.2015.7237287 [retrieved on Sep. 2, 2015].

(Continued)

*Primary Examiner* — John J Lee
(74) *Attorney, Agent, or Firm* — Harrity & Harrity, LLP

(57) ABSTRACT

A method, a user equipment, an apparatus, and a computer program product for wireless communication are provided. The user equipment may identify a power consumption condition that relates to a downlink channel associated with the user equipment. The power consumption condition may correspond to a time period that is shorter than or equal to a transmission time interval of the user equipment. The user equipment may configure one or more modems of the user equipment to reduce power consumption during the time period.

30 Claims, 16 Drawing Sheets

(51) Int. Cl.
*G06F 1/3234* (2019.01)
*H04L 12/18* (2006.01)
*H04W 52/02* (2009.01)
*H04L 1/00* (2006.01)
*H04L 1/06* (2006.01)

(52) U.S. Cl.
CPC .............. *H04L 1/0053* (2013.01); *H04L 1/06* (2013.01); *H04L 12/189* (2013.01); *H04W 52/0232* (2013.01); *H04W 52/0245* (2013.01); *Y02D 70/00* (2018.01); *Y02D 70/1242* (2018.01); *Y02D 70/1262* (2018.01); *Y02D 70/142* (2018.01); *Y02D 70/146* (2018.01); *Y02D 70/449* (2018.01)

(58) Field of Classification Search
USPC ................ 455/522, 572, 574, 452.1, 509
See application file for complete search history.

(56) References Cited

U.S. PATENT DOCUMENTS

| | | |
|---|---|---|
| 2011/0176466 A1 | 7/2011 | Lindoff et al. |
| 2012/0135696 A1 | 5/2012 | Lerzer et al. |
| 2014/0254444 A1* | 9/2014 | Kim .................. H04W 52/0225 370/311 |
| 2014/0362744 A1* | 12/2014 | Yan .......................... H04B 7/26 370/280 |
| 2015/0282154 A1* | 10/2015 | Yavuz ............... H04W 52/0238 370/311 |

OTHER PUBLICATIONS

International Search Report and Written Opinion—PCT/US2017/048229—ISA/EPO—dated Nov. 22, 2017.

* cited by examiner

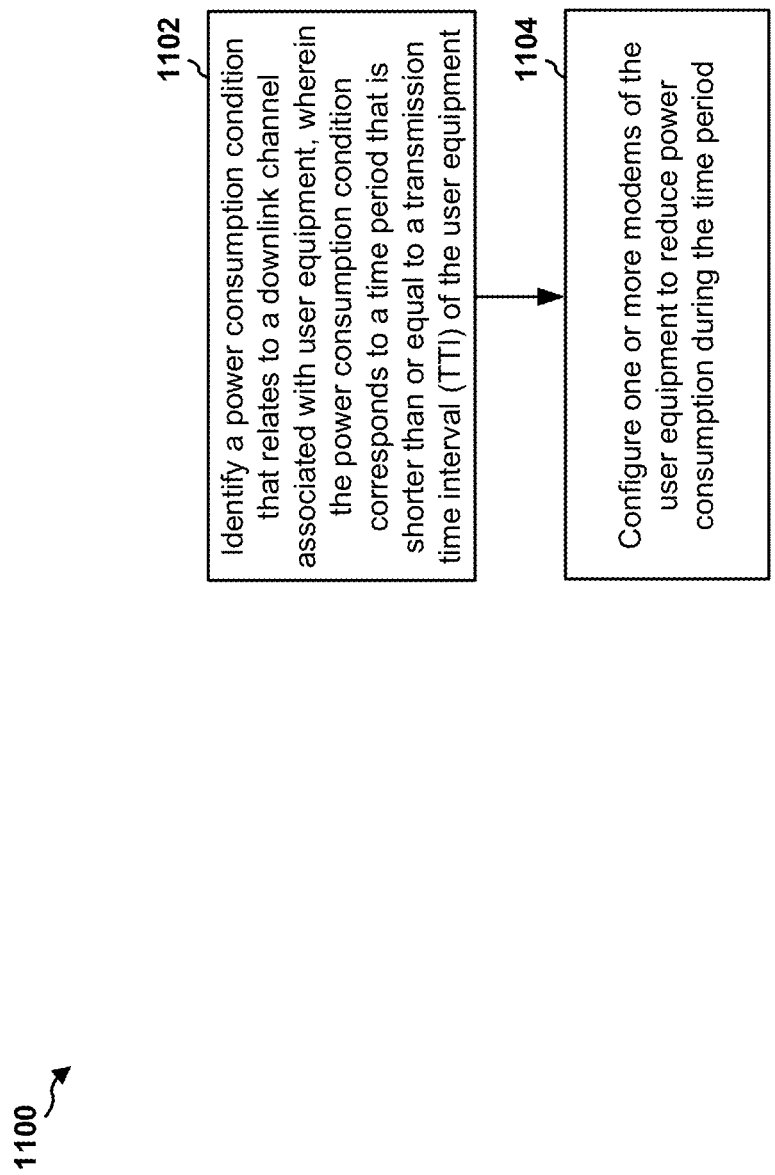

TECHNIQUES FOR REDUCING POWER CONSUMPTION BASED AT LEAST IN PART ON RECONFIGURATION OF A USER EQUIPMENT IN A SUB-TRANSMISSION TIME INTERVAL (TTI) RANGE

CROSS-REFERENCE TO RELATED APPLICATION UNDER 35 U.S.C. § 119

This application claims priority to U.S. Provisional Patent Application No. 62/378,917, filed Aug. 24, 2016, entitled "TECHNIQUES FOR REDUCING POWER CONSUMPTION BASED AT LEAST IN PART ON RECONFIGURATION OF A USER EQUIPMENT IN A SUB-TRANSMISSION TIME INTERVAL (TTI) RANGE," which is hereby expressly incorporated by reference herein.

BACKGROUND

Field

The present disclosure relates generally to communication systems, and more particularly, to a technique for reducing power consumption based at least in part on reconfiguration of a user equipment (UE) in a sub-TTI range.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

A base station may schedule transmissions to or from a UE using a transmission time interval (TTI). A TTI is a parameter related to encapsulation of data from higher layers into frames for transmission on the radio link layer. TTI refers to the duration of a transmission on a radio link of the UE. For example, to combat errors due to fading and interference on the radio link, data may be divided at the transmitter into blocks and then bits within each block may be encoded and interleaved. The TTI of the UE is equal to the length of time required to transmit one such block. At the receiver, all bits from a given block must be received before they can be de-interleaved and decoded.

The UE may perform operations to reduce battery consumption of the UE, such as adapting modem resources based at least in part on channel dynamics, scheduling rates, absence of data transmission on the DL or the UL, or the like. However, these operations may be performed on a time scale that is longer than the TTI, and may be slow to adapt to changing channel conditions (e.g., when the changing channel conditions are in the sub-TTI time range). Thus, there is a need for power consumption reduction techniques that can be performed in the sub-TTI time range (e.g., a time range equal to or shorter than the TTI).

SUMMARY

Aspects described herein permit a UE to identify an opportunity to perform an operation, in a length of time shorter than a TTI of the UE, to reduce battery consumption of the UE. As examples, the opportunity to perform the operation to reduce battery consumption may include identifying a sub-TTI time period in which an observed channel capacity of the UE exceeds a channel capacity requirement of the UE, identifying a time period in which a prioritized channel or bearer is to be received or processed, and/or the like. The operation to reduce battery consumption may include activating or deactivating a receiver chain of the UE, reconfiguring a decoder of the UE, reconfiguring a demodulator of the UE, reconfiguring a channel estimation mode of the UE, or the like.

In an aspect of the disclosure, a method, a user equipment, an apparatus, and a computer program product are provided.

In some aspects, the method may include identifying, by a user equipment, a power consumption condition that relates to a downlink channel associated with the user equipment. The power consumption condition may correspond to a time period that is shorter than or equal to a transmission time interval of the user equipment. The method may include configuring, by the user equipment, one or more modems of the user equipment to reduce power consumption during the time period.

In some aspects, the user equipment may include memory and one or more processors coupled to the memory. The memory and the one or more processors may be configured to identify a power consumption condition that relates to a downlink channel associated with the user equipment. The power consumption condition may correspond to a time period that is shorter than or equal to a transmission time interval of the user equipment. The memory and the one or more processors may be configured to configure one or more modems of the user equipment to reduce power consumption during the time period.

In some aspects, the apparatus may include means for identifying a power consumption condition that relates to a downlink channel associated with the apparatus. The power consumption condition may correspond to a time period that is shorter than or equal to a transmission time interval of the apparatus. The apparatus may include means for configuring one or more modems of the apparatus to reduce power consumption during the time period.

In some aspects, the computer program product may include a non-transitory computer-readable medium storing one or more instructions for wireless communication that, when executed by one or more processors of a user equipment, cause the one or more processors to identify a power consumption condition that relates to a downlink channel associated with the user equipment. The power consumption condition may correspond to a time period that is shorter than or equal to a transmission time interval of the user equipment. The one or more instructions may cause the one or more processors to configure one or more modems of the user equipment to reduce power consumption during the time period.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIG. 11 is a flow chart of a method of wireless communication.

DETAILED DESCRIPTION

Figure 1:
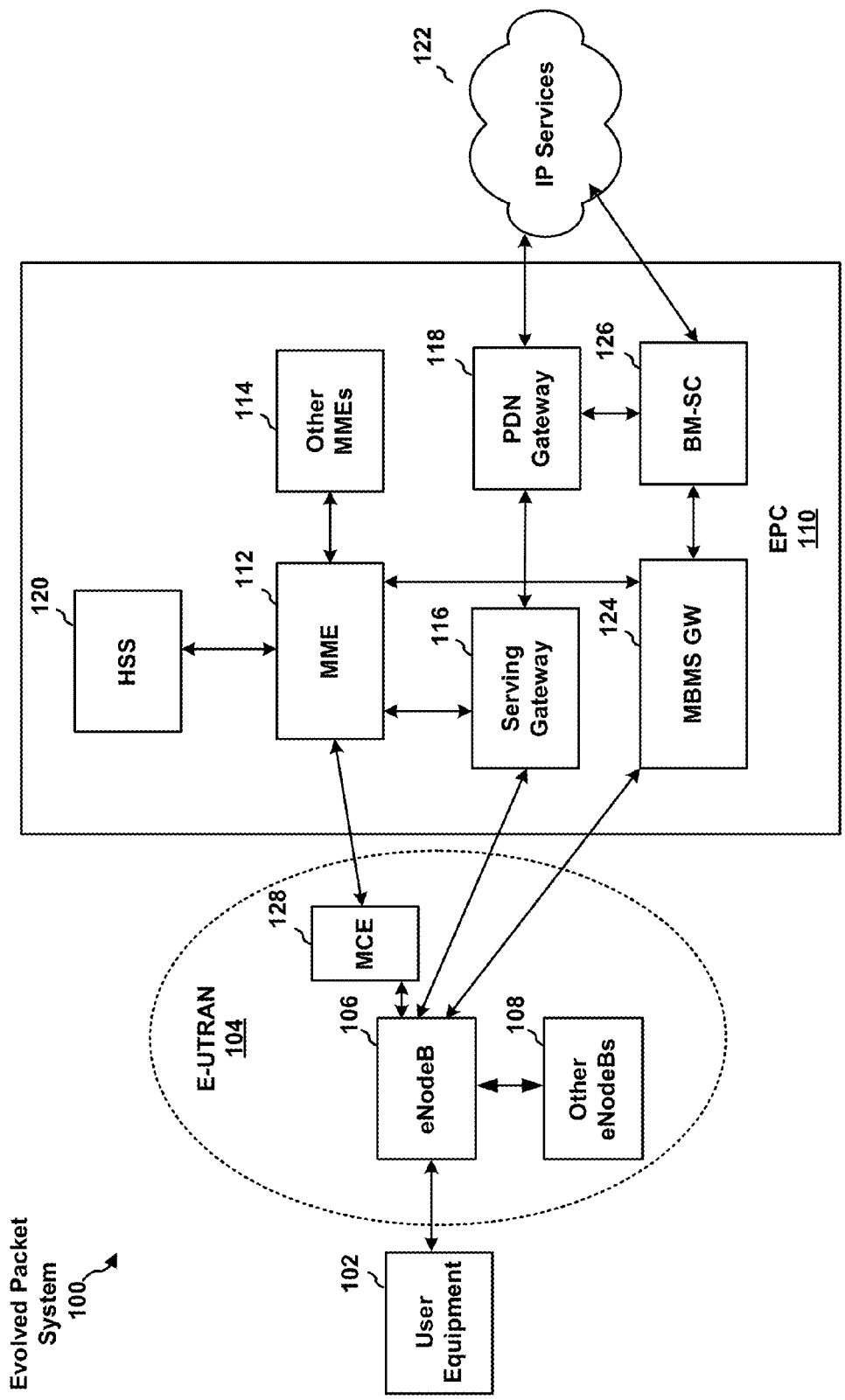
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

As indicated above, FIG. 1 is provided as an example. Other examples are possible and may differ from what was described in connection with FIG. 1.

Figure 2:
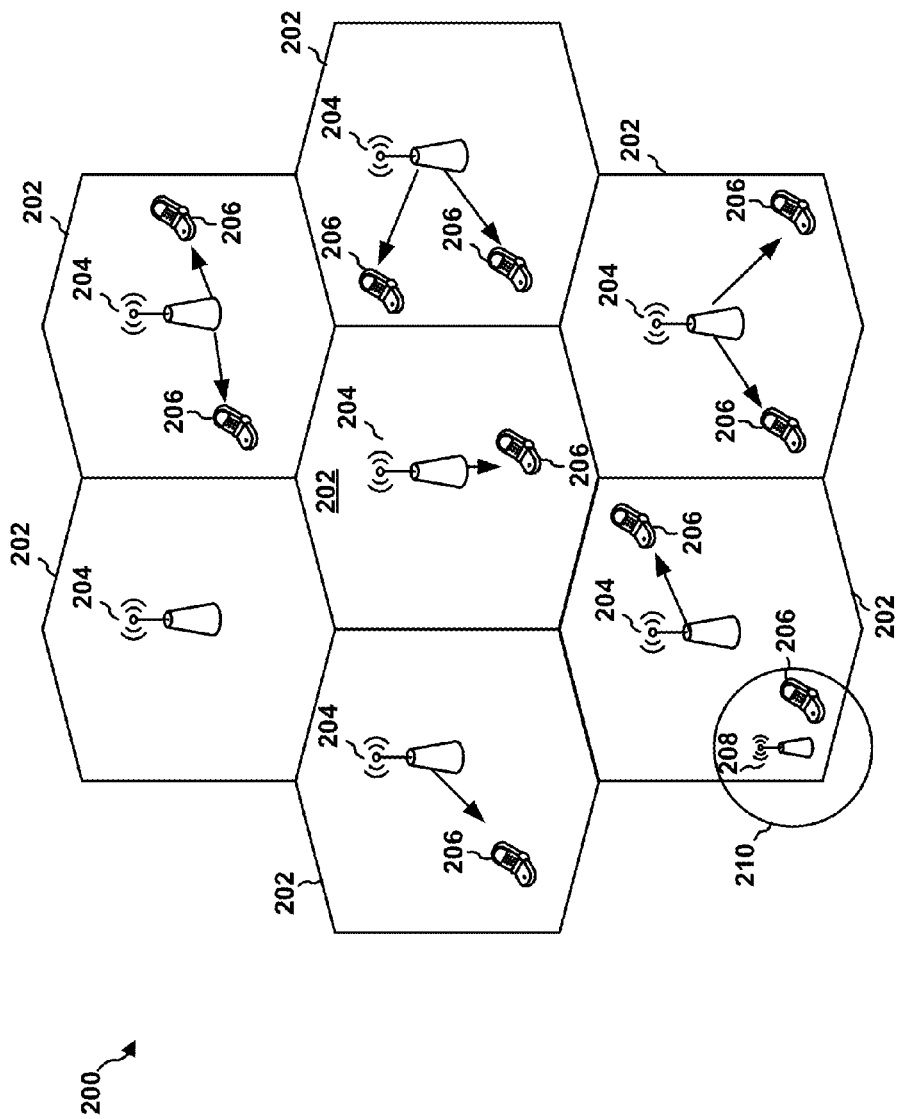
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, orthogonal frequency division multiplexing (OFDM) is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

As indicated above, FIG. 2 is provided as an example. Other examples are possible and may differ from what was described in connection with FIG. 2.

Figure 3:
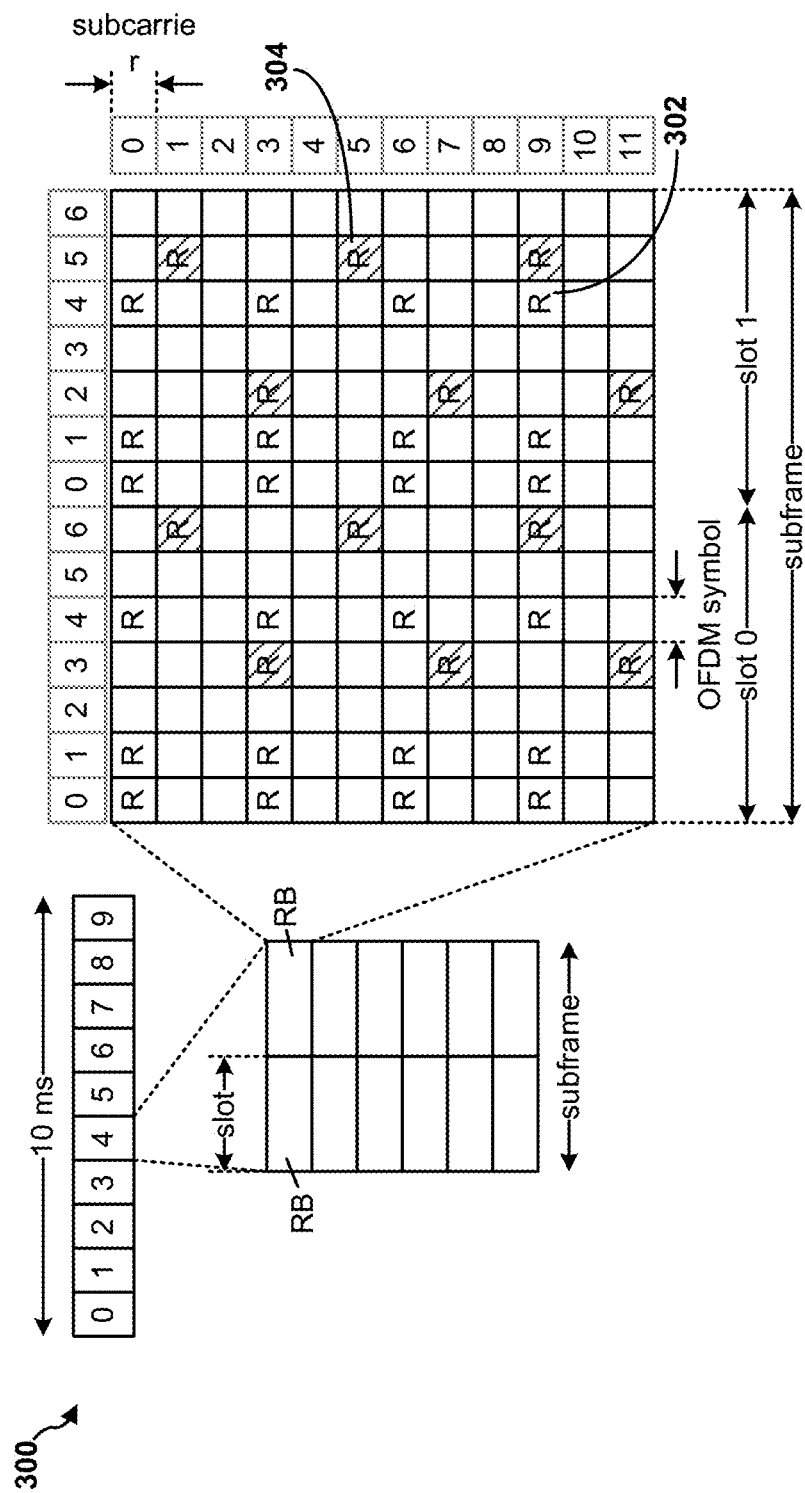
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

As indicated above, FIG. 3 is provided as an example. Other examples are possible and may differ from what was described in connection with FIG. 3.

Figure 4:
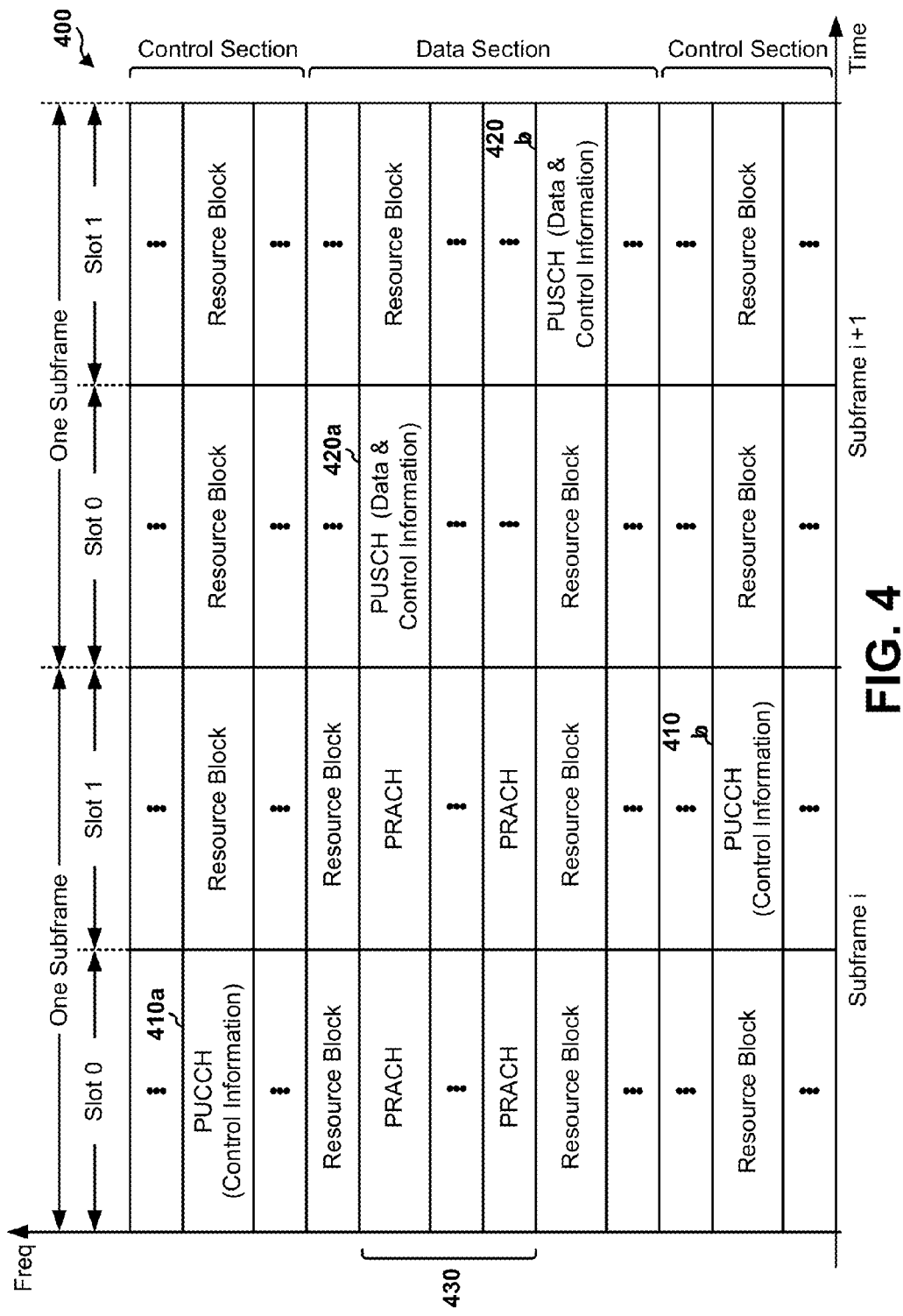
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

As indicated above, FIG. 4 is provided as an example. Other examples are possible and may differ from what was described in connection with FIG. 4.

Figure 5:
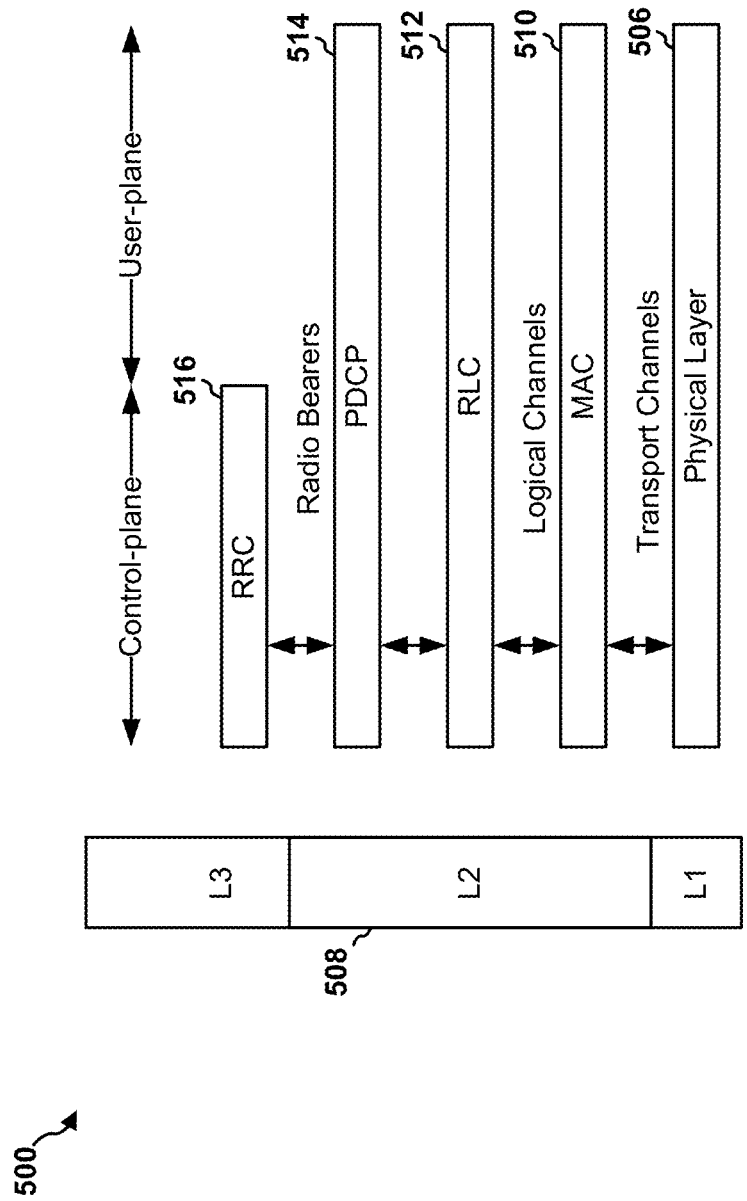
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

As indicated above, FIG. 5 is provided as an example. Other examples are possible and may differ from what was described in connection with FIG. 5.

Figure 6:
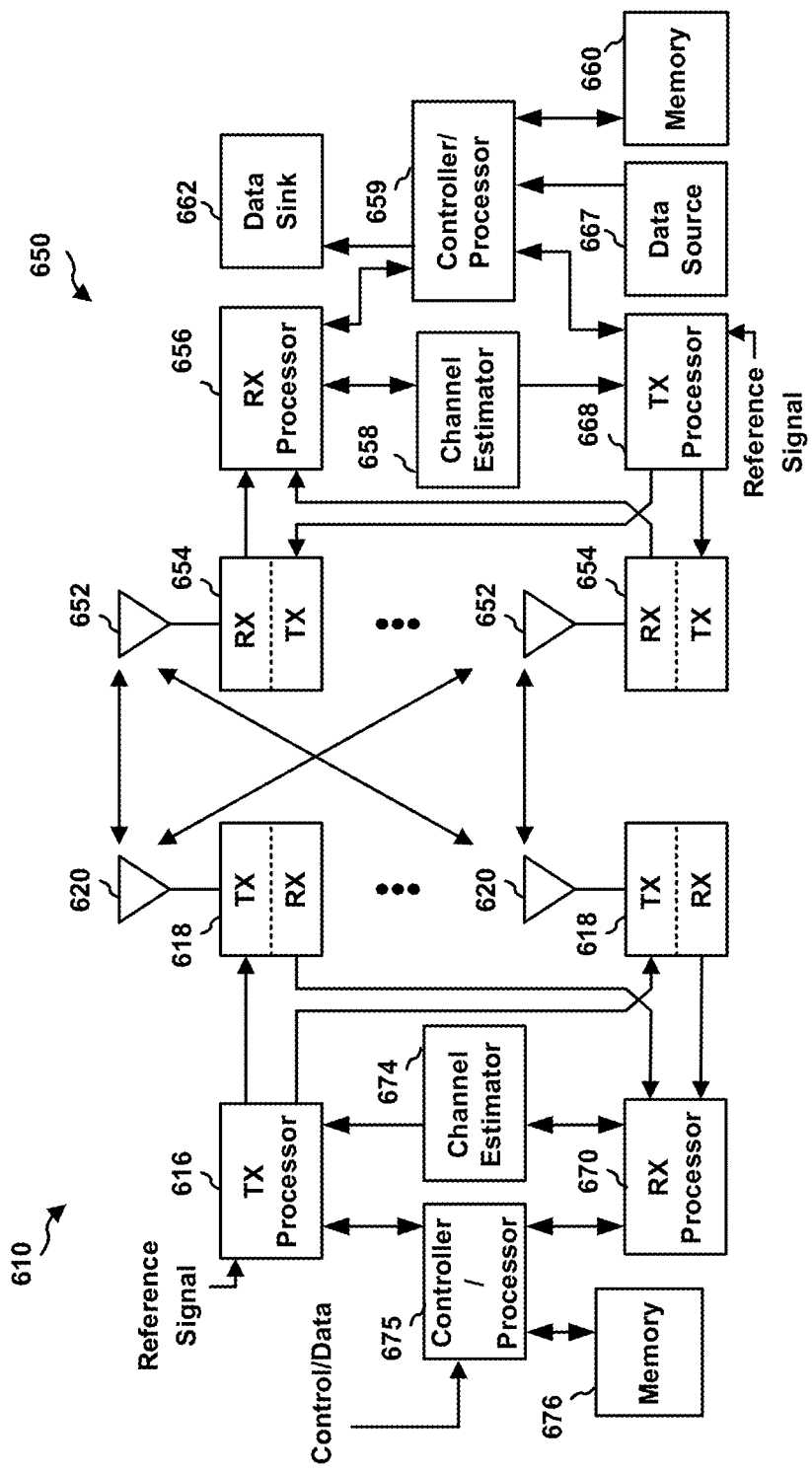
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based at least in part on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based at least in part on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate a radio frequency (RF) carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based at least in part on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based at least in part on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

As indicated above, FIG. 6 is provided as an example. Other examples are possible and may differ from what was described in connection with FIG. 6.

Figure 7:
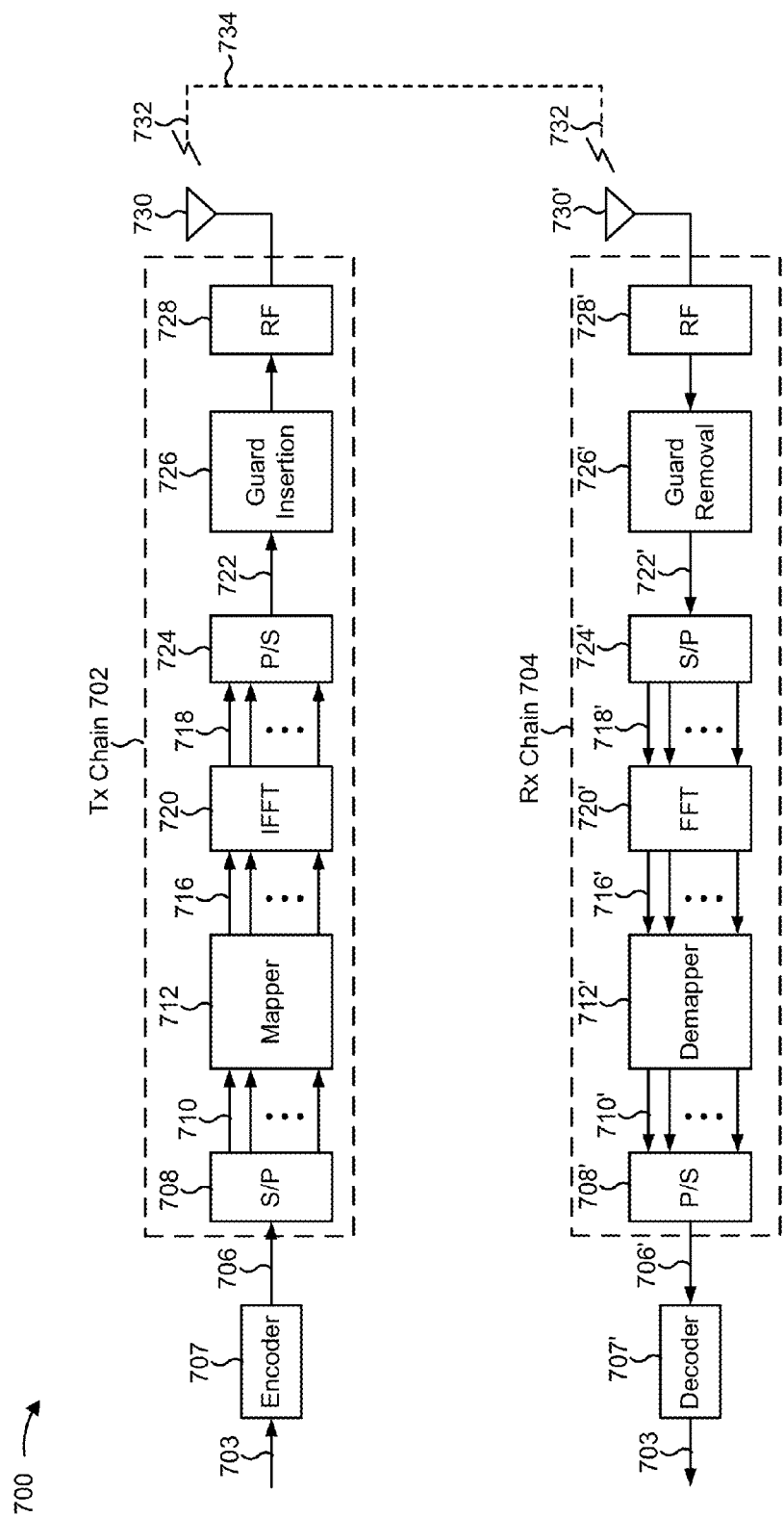
FIG. 7 is a diagram illustrating an example transmission chain and an example receiver chain that may be used within a wireless communication system.

FIG. 7 is a diagram illustrating an example 700 of a transmission (Tx) chain 702 and a receiver (Rx) chain 704 that may be used within a wireless communication system, in accordance with various aspects of the present disclosure. In some aspects, portions of Tx chain 702 may be implemented in a transmitter 618TX and/or 654TX, shown in FIG. 6. In some aspects, Tx chain 702 may be implemented in eNB 106, 204, 610 for transmitting data 706 to UE 102, 206, 650 on a downlink channel. In some aspects, Tx chain 702 may be implemented in UE 102, 206, 650 for transmitting data 706 to eNB 106, 204, 610 on an uplink channel.

An encoder 707 may alter a signal (e.g., a bitstream) 703 into data 706. Data 706 to be transmitted is provided from encoder 707 as input to a serial-to-parallel (S/P) converter 708. In some aspects, S/P converter 708 may split the transmission data into N parallel data streams 710.

The N parallel data streams 710 may then be provided as input to a mapper 712. Mapper 712 may map the N parallel data streams 710 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 712 may output N parallel symbol streams 716, each symbol stream 716 corresponding to one of N orthogonal subcarriers of an inverse fast Fourier transform (IFFT) component 720. These N parallel symbol streams 716 are represented in the frequency domain and may be converted into N parallel time domain sample streams 718 by IFFT component 720.

In some aspects, N parallel modulations in the frequency domain are equal to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 718 may be converted into an OFDM/OFDMA symbol stream 722 by a parallel-to-serial (P/S) converter 724. A guard insertion component 726 may insert a guard interval between successive OFDM/OFDMA symbols in the OFDM/OFDMA symbol stream 722. The output of guard insertion component 726 may then be unconverted to a desired transmit frequency band by a radio frequency (RF) front end 728. An antenna 730 may then transmit the resulting signal 732.

In some aspects, Rx chain 704 may utilize OFDM/OFDMA. In some aspects, portions of Rx chain 704 may be implemented in a receiver 618RX and/or 654RX, shown in FIG. 6. In some aspects, Rx chain 704 may be implemented in UE 102, 206, 650 for receiving data 706 from eNB 106, 204 on a downlink channel. In some aspects, Rx chain 704 may be implemented in eNB 106, 204, 610 for receiving data 706 from UE 102, 206, 650 on an uplink channel.

A transmitted signal 732 is shown traveling over a wireless channel 734 from Tx chain 702 to Rx chain 704. When a signal 732' is received by an antenna 730', the received signal 732' may be downconverted to a baseband signal by an RF front end 728'. A guard removal component 726' may then remove the guard interval that was inserted between OFDM/OFDMA symbols by guard insertion component 726.

The output of guard removal component 726' may be provided to an S/P converter 724'. The output may include an OFDM/OFDMA symbol stream 722', and S/P converter 724' may divide the OFDM/OFDMA symbol stream 722' into N parallel time-domain symbol streams 718', each of which corresponds to one of the N orthogonal subcarriers. A fast Fourier transform (FFT) component 720' may convert the N parallel time-domain symbol streams 718' into the frequency domain and output N parallel frequency-domain symbol streams 716'.

A demapper 712' may perform the inverse of the symbol mapping operation that was performed by mapper 712, thereby outputting N parallel data streams 710'. A P/S converter 708' may combine the N parallel data streams 710' into a single data stream 706'. Ideally, data stream 706' corresponds to data 706 that was provided as input to Tx chain 702. Data stream 706' may be decoded into a decoded data stream 703 by decoder 707'.

Aspects described herein refer to configuring modem resources to reduce power consumption, which may include configuring (e.g., activating, deactivating, or configuring to a low-power state) antenna 730', configuring (e.g., activating, deactivating, or configuring to a low-power state) decoder 707', and/or configuring (e.g., activating, deactivating, or configuring to a low-power state) any one or more components of Rx chain 704.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single components, or a single components shown in FIG. 7 may be implemented as multiple, distributed components. Additionally, or alternatively, a set of components (e.g., one or more components) shown in FIG. 7 may perform one or more functions described as being performed by another set of components shown in FIG. 7. In some aspects, a plurality of Tx chains and/or a plurality of Rx chains may be employed. In some aspects, two or more of such plurality of chains may share one or more power amplifiers.

Figure 8A:
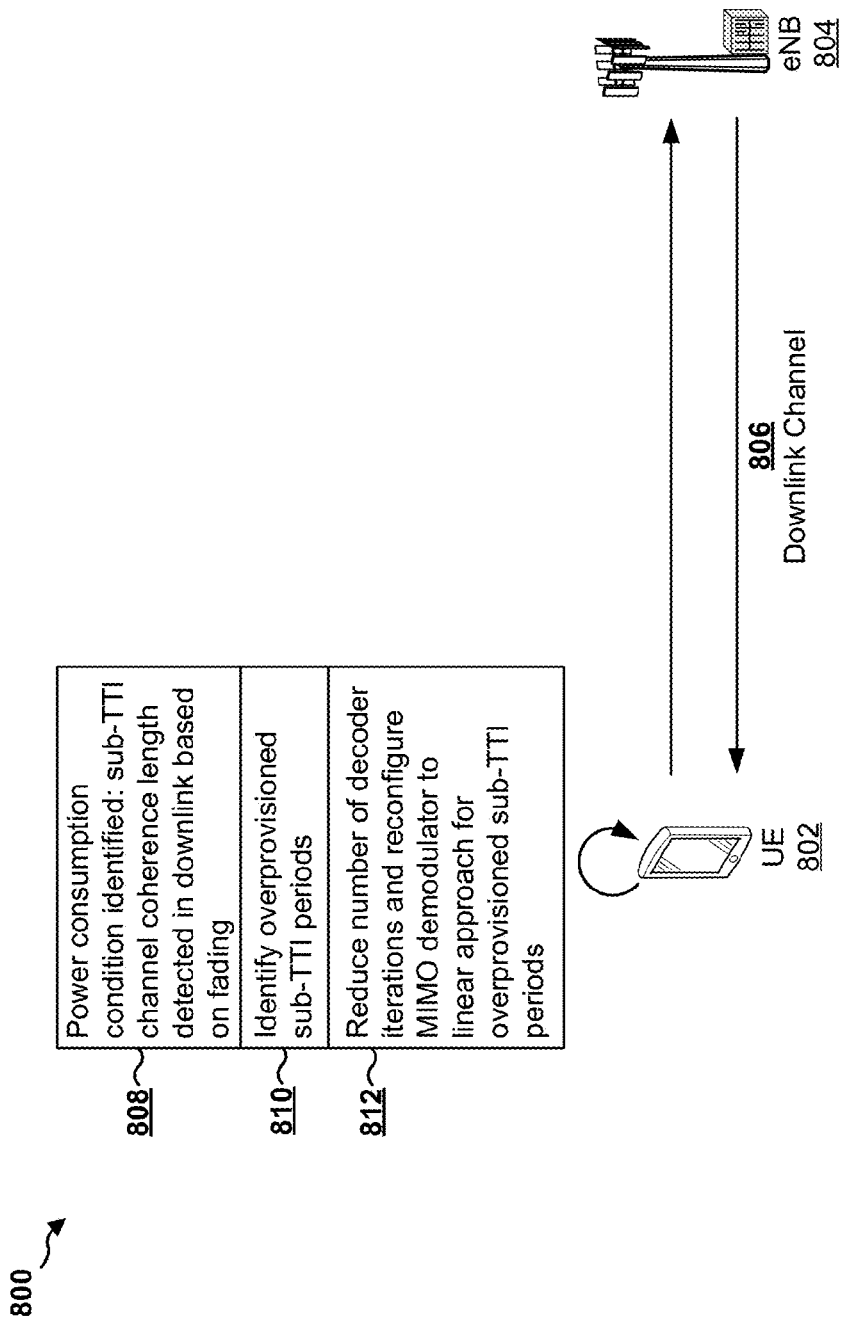
FIGS. 8A-8C are diagrams illustrating an example system configured to reduce power consumption based at least in part on reconfiguration of a user equipment in a sub-transmission time interval (TTI) range.
Figure 8B:
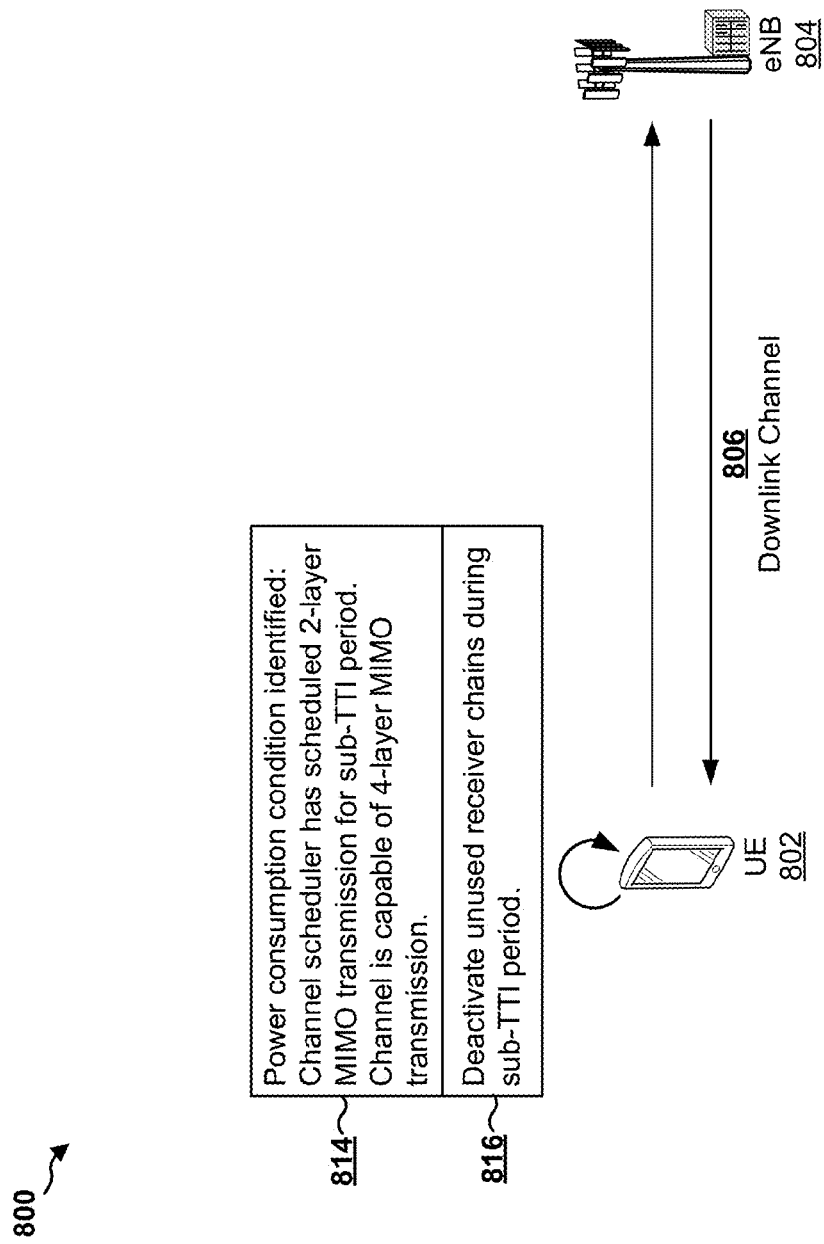
Figure 8C:
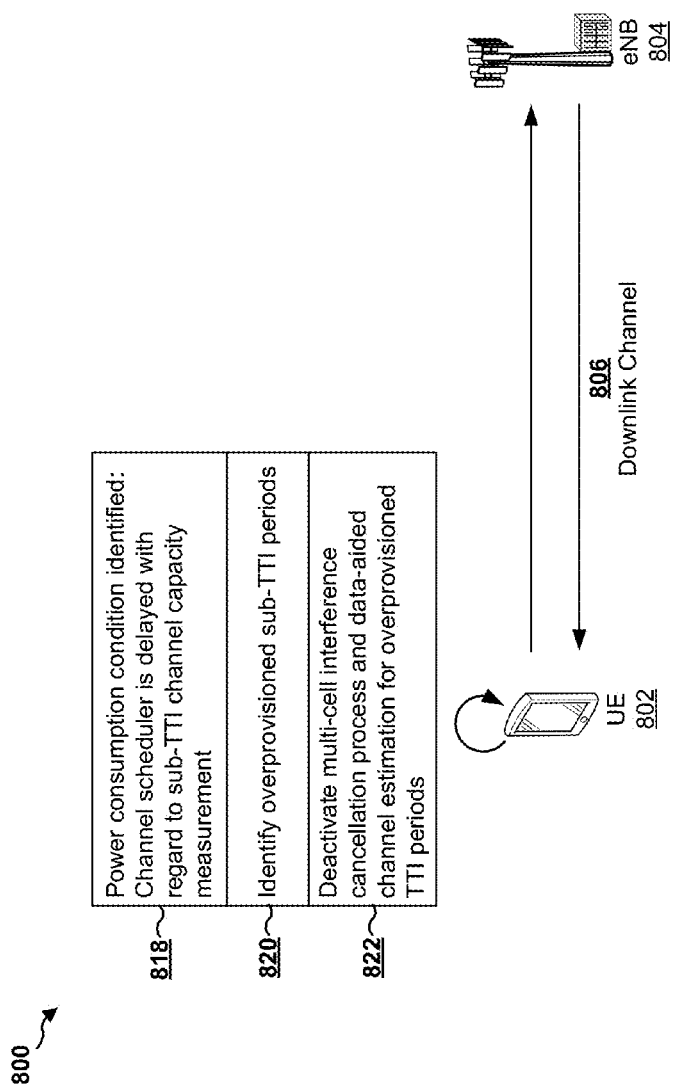

FIGS. 8A-8C are diagrams illustrating an example system 800 configured to reduce power consumption based at least in part on reconfiguration of a user equipment in a sub-transmission time interval (TTI) range. As shown, FIGS. 8A-8C include UE 802 and eNB 804. As further shown, UE 802 may be associated with a downlink channel 806.

UE 802 may include a wireless communication device. For example, UE 802 may include UE 102, UE 206, UE 650, and/or another UE described herein.

The eNB 804 may include one or more base stations and/or eNBs, such as eNB 106, eNB 204, eNB 610, and/or another base station or eNB described herein. The downlink channel 806 may include a physical downlink shared channel (PDSCH), a physical downlink control channel (PDCCH), or the like.

As shown in FIG. 8A, and by reference number 808, the UE 802 may identify a power consumption condition. Here, the UE 802 identifies the power consumption condition based at least in part on detecting a sub-TTI channel coherence time in the downlink channel 806 based at least in part on fast fading. Fading is variation in a channel quality or channel capacity based at least in part on constructive and/or destructive interference due to diffraction and/or reflection of a cellular signal. For example, when a direct cellular signal is diffracted or reflected, the diffracted or reflected signal may be received by UE 802 at a different time than the direct cellular signal. This may cause constructive or destructive interference in the direct cellular signal at the UE 802, which is referred to as fading. Based at least in part on the fading, channel quality or channel capacity may vary over time as compared to an expected or required value.

The UE 802 may identify the power consumption condition when a channel coherence time is less than a time period associated with the TTI of the UE 802. A channel coherence time is a length of time in which an observed channel quality or channel capacity is consistent or predictable. When fading causes changes in the observed channel quality or channel capacity more frequently than the time period associated with the TTI of the UE 802, the changes in the observed channel quality or channel capacity may lead to some sub-TTI time periods having better channel quality or channel capacity than other sub-TTI time periods. As one possible example of a TTI time period, in an LTE network, a TTI time period may have a length of 1 ms (e.g., a subframe), and each frame may be associated with ten TTIs.

As shown by reference number 810, the UE 802 may identify overprovisioned sub-TTI time periods. An overprovisioned sub-TTI time period is a time period, that is shorter than or equal to a TTI time period, in which an observed channel quality or channel capacity is greater than a required channel quality or channel capacity. The observed channel quality or channel capacity may be based at least in part on a channel capacity parameter or a channel quality parameter, such as a channel quality indicator (CQI), a reference signal received quality (RSRQ) measurement, a reference signal received power (RSRP) measurement, a signal to noise ratio (SNR) measurement, a spectral noise measurement (e.g., energy per chip, noise spectral density, etc.), a received signal strength indicator (RSSI), or the like. The required channel quality or channel capacity may be determined based at least in part on a channel quality or channel capacity that is needed to successfully decode subframes or data units received on the downlink channel 806.

As shown by reference number 812, based at least in part on identifying the overprovisioned sub-TTI periods, the UE 802 may reduce a number of decoder iterations to be performed during the overprovisioned sub-TTI periods, and/or may reconfigure a MIMO demodulator to use a linear demodulation approach for the overprovisioned sub-TTI periods. By reducing the number of decoder iterations to be performed, the UE 802 reduces processor usage and power consumption of the UE 802. Further, the UE 802 may reconfigure a MIMO demodulator of a modem of the UE 802 from a non-linear demodulation approach (e.g., a reduced maximum-likelihood demodulation approach, or the like) to a linear demodulation approach (e.g., a minimum mean square error approach, or the like), which reduces processor usage and power consumption of the UE 802. Thus, the UE 802 reduces power consumption of the UE 802 based at least in part on reconfiguring one or more modem resources of the UE 802.

In some aspects, the UE 802 may configure the one or more modem resources in another fashion based at least in part on identifying the overprovisioned sub-TTI periods. For example, the UE 802 may configure a receiver chain (e.g., Rx chain 704) or a component of a receiver chain to a low power mode, or may deactivate the receiver chain or the component of the receiver chain to reduce power consumption during the overprovisioned sub-TTI time periods. As yet another example, the UE 802 may configure a channel estimation process to reduce power consumption during the overprovisioned sub-TTI time periods, as described in more detail in connection with FIG. 8C, below.

As shown in FIG. 8B, and by reference number 814, the UE 802 may identify a power consumption condition based at least in part on a MIMO transmission configuration of the UE 802 during a sub-TTI period. Here, the UE 802 identifies the power consumption condition based at least in part on a two-layer MIMO transmission for a sub-TTI period being scheduled or received when the downlink channel 806 is capable of four-layer MIMO transmission. For example, when receiving data using MIMO, the UE 802 may transmit or receive the data on multiple, different receiver chains. A receiver chain may include one or more RF components (e.g., a component that receives or generates RF signals), one or more analog components (e.g., amplifiers, frequency synthesizers, channel select filters, etc.), one or more digital components (e.g., a digital baseband, a modem component, etc.), a combination of two or more of the above components, or the like, as described in connection with Rx chain 704.

A MIMO transmission may be received on two or more receiver chains based at least in part on a MIMO transmission configuration of the UE 802. For example, a two-layer MIMO transmission may be received on two receiver chains, and a four-layer MIMO transmission may be received on four receiver chains. The UE 802 may use more power and/or processor resources to activate or operate four receiver chains than the UE 802 uses to activate or operate two receiver chains.

As shown by reference number 816, the UE 802 may deactivate one or more receiver chains during the sub-TTI period (e.g., shorter than or equal to a TTI time period) for which the two-layer MIMO transmission is scheduled. For example, the UE 802 may deactivate one or more receiver chains and/or one or more components of a receiver chain. As another example, when the eNB 804 transmits a two-layer MIMO transmission and the UE 802 is capable of or configured for a four-layer MIMO transmission, the UE 802 may deactivate two receiver chains, corresponding to two of the four MIMO transmission layers associated with the UE 802. Thus, the UE 802 reduces power consumption based at least in part on reconfiguring one or more modem resources of the UE 802.

In some aspects, the UE 802 may configure the one or more modem resources in another fashion based at least in part on identifying the overprovisioned sub-TTI periods. For example, the UE 802 may configure a receiver chain (e.g., Rx chain 704) or a component of a receiver chain to a low power mode to reduce power consumption during the overprovisioned sub-TTI time periods. As another example, the UE 802 may modify a demodulation and/or decoding process of the UE 802 to reduce power consumption during the overprovisioned sub-TTI time periods, as described in more detail in connection with FIG. 8A, above. As yet another example, the UE 802 may configure a channel estimation process to reduce power consumption during the overprovisioned sub-TTI time periods, as described in more detail in connection with FIG. 8C, below.

As shown in FIG. 8C, and by reference number 818, the UE 802 may identify a power consumption condition based at least in part on a delay associated with performing channel scheduling using a measurement of observed channel capacity or channel quality of the downlink channel 806, in a sub-TTI time period. For example, a channel scheduler of the UE 802 may schedule uplink and/or downlink transmissions for the UE 802. The channel scheduler may schedule the uplink and/or downlink transmissions based at least in part on the observed channel capacity or channel quality of the downlink channel 806. However, in some cases, the channel scheduler may not be capable of scheduling transmissions within a sub-TTI time period (e.g., based at least in part on sub-TTI period fluctuations in channel capacity or channel quality and/or based at least in part on a delay between measuring the observed channel capacity or channel and scheduling the uplink or downlink transmissions). In some aspects, the delay between measuring observed channel capacity or channel quality and performing channel scheduling may be associated with latency caused by filtering the downlink channel 806, or another type of latency.

As shown by reference number 820, the UE 802 may identify overprovisioned sub-TTI periods (e.g., based at least in part on observed channel capacity or channel quality in the sub-TTI periods being greater than a required channel capacity or channel quality in the sub-TTI periods). The observed channel capacity or channel quality may be determined based at least in part on, for example, a CQI, an RSRQ measurement, an RSRP measurement, a SNR measurement, a spectral noise measurement (e.g., energy per chip, noise spectral density, etc.), an RSSI measurement, or the like. The required channel capacity or channel quality may be determined based at least in part on a channel capacity or channel quality that is needed to successfully decode subframes or data units received on the downlink channel 806.

As shown by reference number 822, based at least in part on identifying the overprovisioned sub-TTI periods, the UE 802 may deactivate a multi-cell interference cancellation process. A multi-cell interference cancellation process is a process by which interference from cellular signals of multiple, different cells (e.g., that are provided by one or more eNBs 804) is reduced. For example, a multi-cell interference cancellation process may coordinate scheduling on downlink channel 806, and may use a linear interference cancelling algorithm to cancel redundant or interfering signals. In some aspects, the UE 802 may limit the multi-cell interference cancellation process (e.g., may reduce an amount of resources of UE 802 devoted to the multi-cell interference cancellation process). By deactivating or limiting the multi-cell interference cancellation process in the overprovisioned sub-TTI periods, the UE 802 conserves processor resources and reduces power consumption.

Additionally, or alternatively, based at least in part on identifying the overprovisioned sub-TTI periods, the UE 802 may deactivate or reduce a data-aided channel estimation mode, or another channel estimation mode. For example, the UE 802 may estimate a channel impulse response based at least in part on a channel estimation mode (e.g., a least squares channel estimation mode, a linear minimum mean squared error channel estimation mode, etc.). In some aspects, the UE 802 may estimate the channel impulse response based at least in part on an advanced channel estimation mode, which may use more processor and/or power resources than a non-advanced channel estimation mode. One example of an advanced channel estimation mode is a data-aided channel estimation mode, which is a method of estimating channel impulse response based at least in part on partially decoded data received on the downlink channel 806. By deactivating or reducing the advanced channel estimation mode (e.g., the data-aided channel estimation mode) for the over-provisioned sub-TTI periods, the UE 802 reduces processor and/or power usage in the over-provisioned sub-TTI periods. Thus, the UE 802 reduces power consumption of the UE 802 based at least in part on reconfiguring one or more modem resources of the UE 802.

In some aspects, the UE 802 may configure the one or more modem resources in another fashion based at least in part on identifying the overprovisioned sub-TTI periods. For example, the UE 802 may configure a receiver chain (e.g., Rx chain 704) or a component of a receiver chain to a low power mode, or may deactivate the receiver chain or the component of the receiver chain to reduce power consumption during the overprovisioned sub-TTI time periods, as described in more detail in connection with FIG. 8B. As another example, the UE 802 may modify a demodulation and/or decoding process or receiver of the UE 802, such as a MIMO interference cancellation receiver, to reduce power consumption during the overprovisioned sub-TTI time periods, as described in more detail in connection with FIG. 8A.

As indicated above, FIGS. 8A-8C are provided as examples. Other examples are possible and may differ from what was described above in connection with FIGS. 8A-8C.

Figure 9:
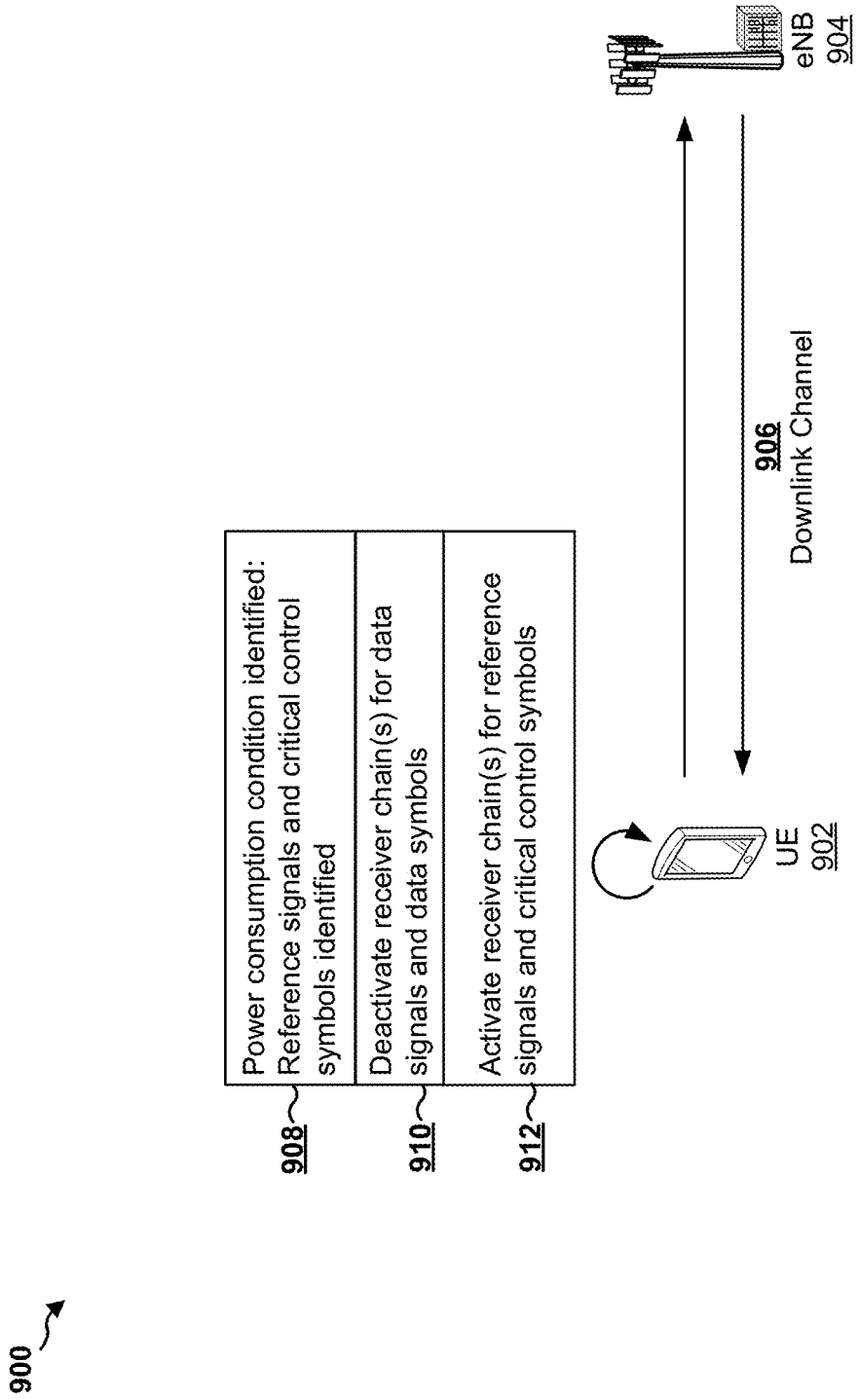
FIG. 9 is a diagram illustrating another example system configured to reduce power consumption based at least in part on reconfiguration of a user equipment in a sub-TTI range.

FIG. 9 is a diagram illustrating another example system 900 configured to reduce power consumption based at least in part on reconfiguration of a user equipment in a sub-TTI range. As shown, FIG. 9 includes UE 902 and eNB 904. As further shown, UE 902 may be associated with a downlink channel 906.

UE 902 may include a wireless communication device. For example, UE 902 may include UE 102, UE 206, UE 650, UE 802, and/or another UE described herein.

The eNB 904 may include one or more base stations and/or eNBs, such as eNB 106, eNB 204, eNB 610, eNB 804, and/or another base station or eNB described herein. The downlink channel 906 may include the PDSCH, the PDCCH, or the like.

As shown in FIG. 9, and by reference number 908, the UE 902 may identify a power consumption condition based at least in part on identifying reference signals and/or control symbols. The reference signals may include, for example, DL reference signals. The control symbols may include, for example, control information received on the PDSCH or PDCCH associated with downlink channel 906, or another control channel. In some aspects, the UE 902 may identify a particular time period corresponding to a particular subframe, portion of a subframe, and/or a sub-TTI period corresponding to the reference signals and/or control symbols. The reference signals may be associated with data signals that carry data payloads corresponding to the reference signals. The control symbols may be associated with data symbols or a data channel, associated with the downlink channel 906 that carry data payloads associated with the control symbols.

As shown by reference number 910, the UE 902 may deactivate one or more receiver chains (e.g., one or more Rx chains 704) for the data signals, data symbols, and/or data channels. For example, the UE 902 may deactivate or reduce power of the one or more receiver chains at times other than the particular time period corresponding to the particular subframe, portion of the subframe, and/or the sub-TTI period of the reference signal and/or control symbol. In other words, the UE 902 may activate or deactivate one or more receiver chains according to a schedule for reference signals and/or control symbols (e.g., may activate the one or more receiver chains for the reference signals and/or control symbols, and may deactivate the one or more receiver chains for data signals or symbols corresponding to the reference signals and/or control symbols). In some aspects, the UE 902 may deactivate or reduce power of one or more components of a receiver chain (e.g., an RF component, an analog component, and/or a digital component). Thus, the UE 902 reduces power consumption of the UE 902 based at least in part on reconfiguring one or more modem resources of the UE 902.

In some aspects, the UE 902 may configure the one or more modem resources in another fashion based at least in part on identifying the overprovisioned sub-TTI periods. For example, the UE 902 may modify a demodulation and/or decoding process of the UE 902 to reduce power consumption during the overprovisioned sub-TTI time periods, as described in more detail in connection with FIG. 8A, above. As yet another example, the UE 902 may configure a channel estimation process to reduce power consumption during the overprovisioned sub-TTI time periods, as described in more detail in connection with FIG. 8C, above.

As shown by reference number 912, the UE 902 may activate one or more receiver chains for the reference signals and/or the control symbols. For example, the UE 902 may activate the one or more receiver chains during the particular time period corresponding to the particular subframe, portion of the subframe, and/or the particular sub-TTI period, to receive the reference signals and/or the control symbols. In some aspects, the UE 902 may activate one or more components of a receiver chain. For example, when an RF component, an analog component, and/or a digital component of the receiver chain has been deactivated for a data signal, the UE 902 may activate the RF component, analog component, and/or digital component for a corresponding reference signal.

In this way, the UE 902 activates or deactivates Rx chains according to a schedule for control/reference signals, and according to a schedule for data signals. The schedule for data signals may be indicated by the control/reference signals.

As indicated above, FIG. 9 is provided as an example. Other examples are possible and may differ from what was described above in connection with FIG. 9.

Figure 10A:
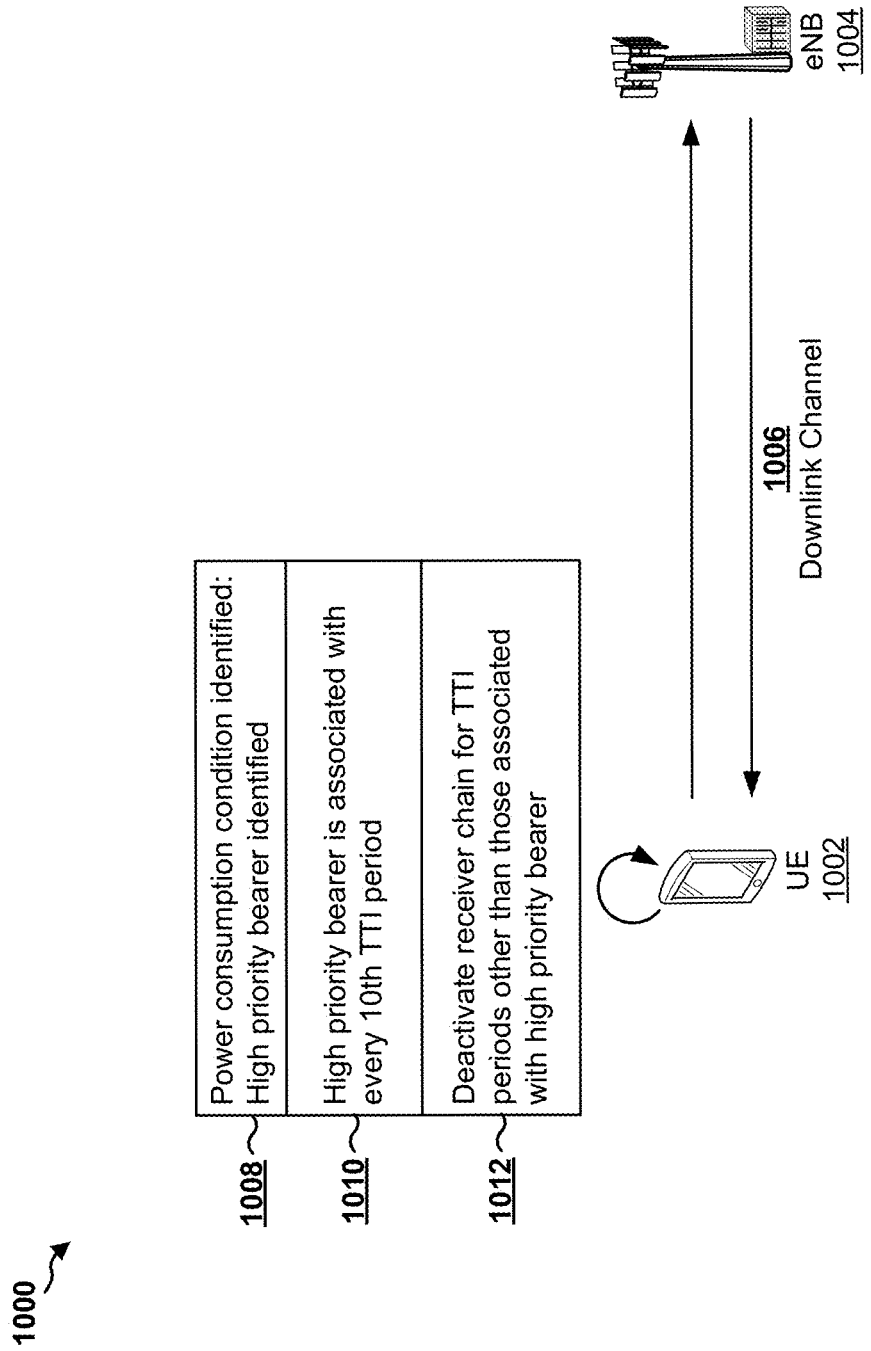
FIGS. 10A and 10B are diagrams illustrating another example system configured to reduce power consumption based at least in part on reconfiguration of a user equipment in a sub-TTI range.
Figure 10B:
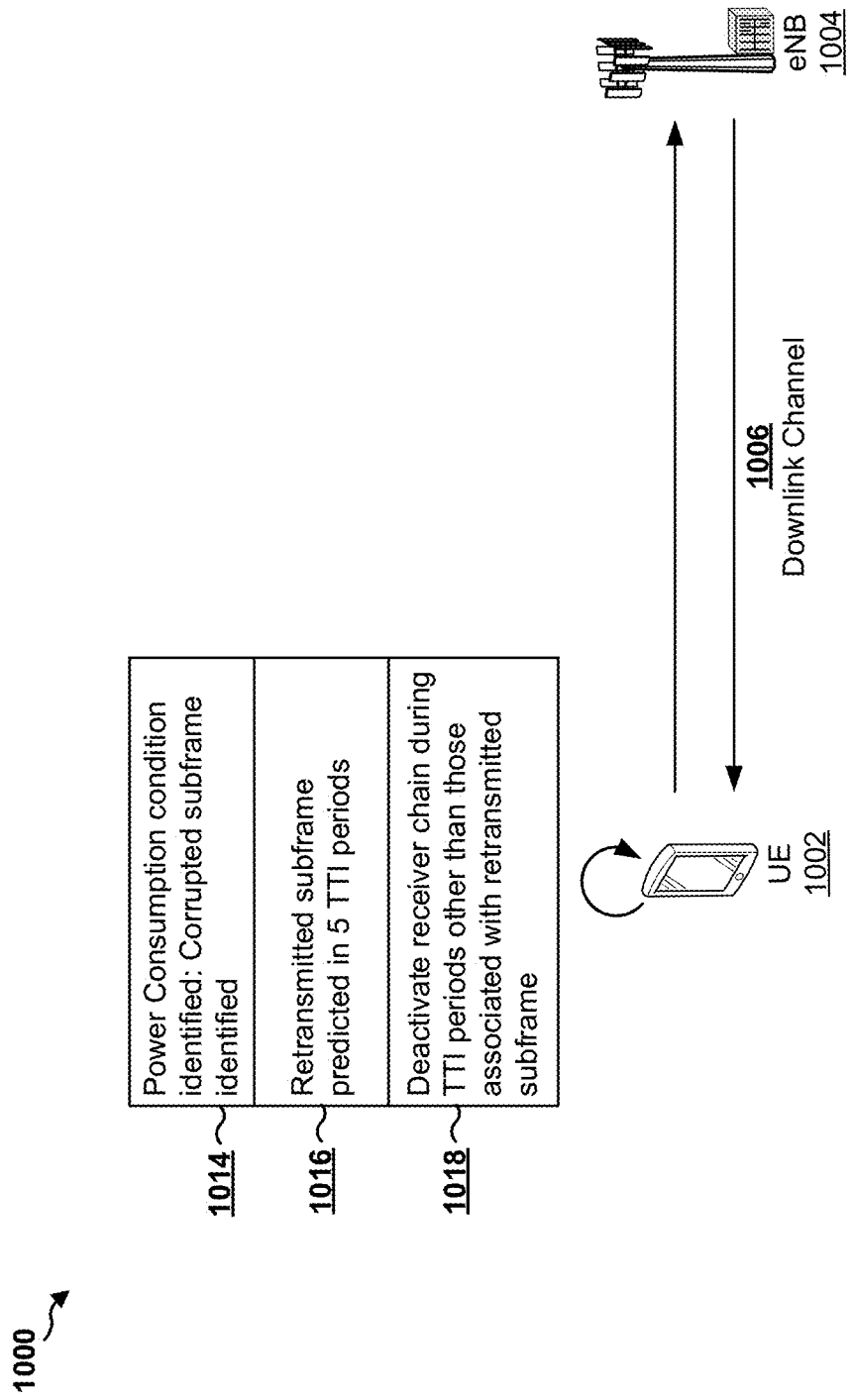

FIGS. 10A and 10B are diagrams illustrating another example system 1000 configured to reduce power consumption based at least in part on reconfiguration of a user equipment in a sub-TTI range. As shown, FIGS. 10A and 10B include UE 1002 and eNB 1004. As further shown, UE 1002 may be associated with a downlink channel 1006.

UE 1002 may include a wireless communication device. For example, UE 1002 may include UE 102, UE 206, UE 650, UE 802, UE 902, and/or another UE described herein.

The eNB 1004 may include one or more base stations and/or eNBs, such as eNB 106, eNB 204, eNB 610, eNB 804, eNB 904, and/or another base station or eNB described herein. The downlink channel 1006 may include a physical downlink shared channel (PDSCH), a physical downlink control channel (PDDCH), or the like.

As shown in FIG. 10A, and by reference number 1008, the UE 1002 may identify a power consumption condition based at least in part on identifying a high priority bearer. A high priority bearer may include, for example, a bearer that is associated with a particular quality of service (QoS) requirement, a particular service (e.g., a voice service, a video service, a data service, etc.), a broadcast or multicast signal, a unicast signal, or the like. In some aspects, a high priority bearer may be associated with particular subframes or portions of subframes. For example, a high priority bearer may be associated with every tenth subframe or TTI, every fiftieth subframe or TTI, or the like.

As shown by reference number 1010, the UE 1002 may determine that the high priority bearer is associated with every tenth TTI period (i.e., every tenth subframe). For example, the UE 1002 may determine that the high priority bearer is associated with every tenth TTI period based at least in part on scheduling information for the downlink channel 1006, based at least in part on receiving two or more subframes associated with the high priority bearer at a spacing of ten TTI periods, or the like.

As shown by reference number 1012, the UE 1002 may deactivate one or more receiver chains of the UE 1002 during TTI periods other than the TTI periods that are associated with the high priority bearer. For example, the UE 1002 may activate the receiver chain for each tenth subframe or TTI period, and may deactivate the receiver chain otherwise. In some aspects, the UE 1002 may activate or deactivate one or more components of a receiver chain (e.g., an RF component of the receiver chain, an analog component of the receiver chain, and/or a digital component of the receiver chain). Thus, the UE 1002 reduces power consumption of the UE 1002 based at least in part on reconfiguring one or more modem resources of the UE 1002.

As shown in FIG. 10B, and by reference number 1014, the UE 1002 may identify a power consumption condition based at least in part on receiving a corrupted subframe. For example, the UE 1002 may identify the corrupted subframe based at least in part on an error correction operation, such as a forward error correction (FEC) operation, a checksum operation, or the like. When the UE 1002 identifies the corrupted subframe, the UE 1002 may transmit a message to the eNB 1004 that indicates that the corrupted subframe was corrupted, such as a hybrid automatic repeat request (HARQ) retransmission request. Based at least in part on the message, the eNB 1004 may retransmit the corrupted subframe, as a retransmitted subframe, to the UE 1002.

As shown by reference number 1016, the UE 1002 may identify a predicted time period in which the retransmitted subframe will be received. As shown, the UE 1002 determines that the retransmitted subframe will be received in 5 TTI periods (e.g., in a fifth subframe after the corrupted subframe). For example, the UE 1002 may identify the predicted time period based at least in part on scheduling information for the downlink channel 1006, based at least in part on time periods in which other retransmitted subframes have been received (e.g., after corrupted subframes), or the like.

As shown by reference number 1018, the UE 1002 may deactivate one or more receiver chains of the UE 1002 during TTI periods other than the TTI period associated with the retransmitted subframe. In some aspects, the UE 1002 may deactivate one or more components of a receiver chain during the TTI periods other than those associated with the retransmitted subframe (e.g., an RF component, an analog component, and/or a digital component). The UE 1002 may activate the one or more receiver chains and/or components of the one or more receiver chains during the TTI period associated with the retransmitted subframe. In this way, the UE 1002 reduces power consumption with regard to subframes other than the retransmitted subframe. Thus, the UE 1002 reduces power consumption of the UE 1002 based at least in part on reconfiguring one or more modem resources of the UE 1002.

As indicated above, FIGS. 10A and 10B are provided as examples. Other examples are possible and may differ from what was described above in connection with FIGS. 10A and 10B.

FIG. 11 is a flow chart of a method 1100 of wireless communication. The method 1100 may be performed by a UE (e.g., the UE 102, 206, 650, 802, 902, 1002, and/or another UE described herein).

At 1102, the UE may identify a power consumption condition that relates to a downlink channel associated with the UE, wherein the power consumption condition corresponds to a time period that is shorter than or equal to a TTI of the UE. For example, the power consumption condition may include a condition wherein an actual channel capacity or an actual channel quality of a downlink channel associated with the UE exceeds a required channel capacity or a required channel quality of the downlink channel in a sub-TTI period. In such a case, the UE may deactivate a subset of receiver chains of the UE, as described in more detail elsewhere herein. As another example, identifying the power consumption condition may include identifying one or more symbols (e.g., control symbols) or portions of a data unit (e.g., reference signals) to be processed in a sub-TTI time period. As yet another example, identifying the power consumption condition may include identifying a prioritized channel or bearer to be processed in a sub-TTI time period.

At 1104, the UE may configure one or more modems of the UE to reduce power consumption during the time period. For example, the UE may deactivate or configure, to a low power mode, one or more components of a receiver chain of the UE, such as Rx chain 704. As another example, the UE may reduce a number of iterations (e.g., of a decoder, an iterative MIMO demodulation and decoding receiver, and/or a MIMO interference cancellation receiver) to be performed in the time period. As yet another example, the UE may reconfigure a MIMO demodulator of the UE (e.g., to a configuration such as a linear demodulation scheme). As still another example, the UE may reconfigure or deactivate a decoder of the UE. As another example, the UE may reconfigure or deactivate a channel estimation mode or component of the UE, such as channel estimator 658. As yet another example, the UE may reconfigure or deactivate a multi-cell interference cancellation process.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
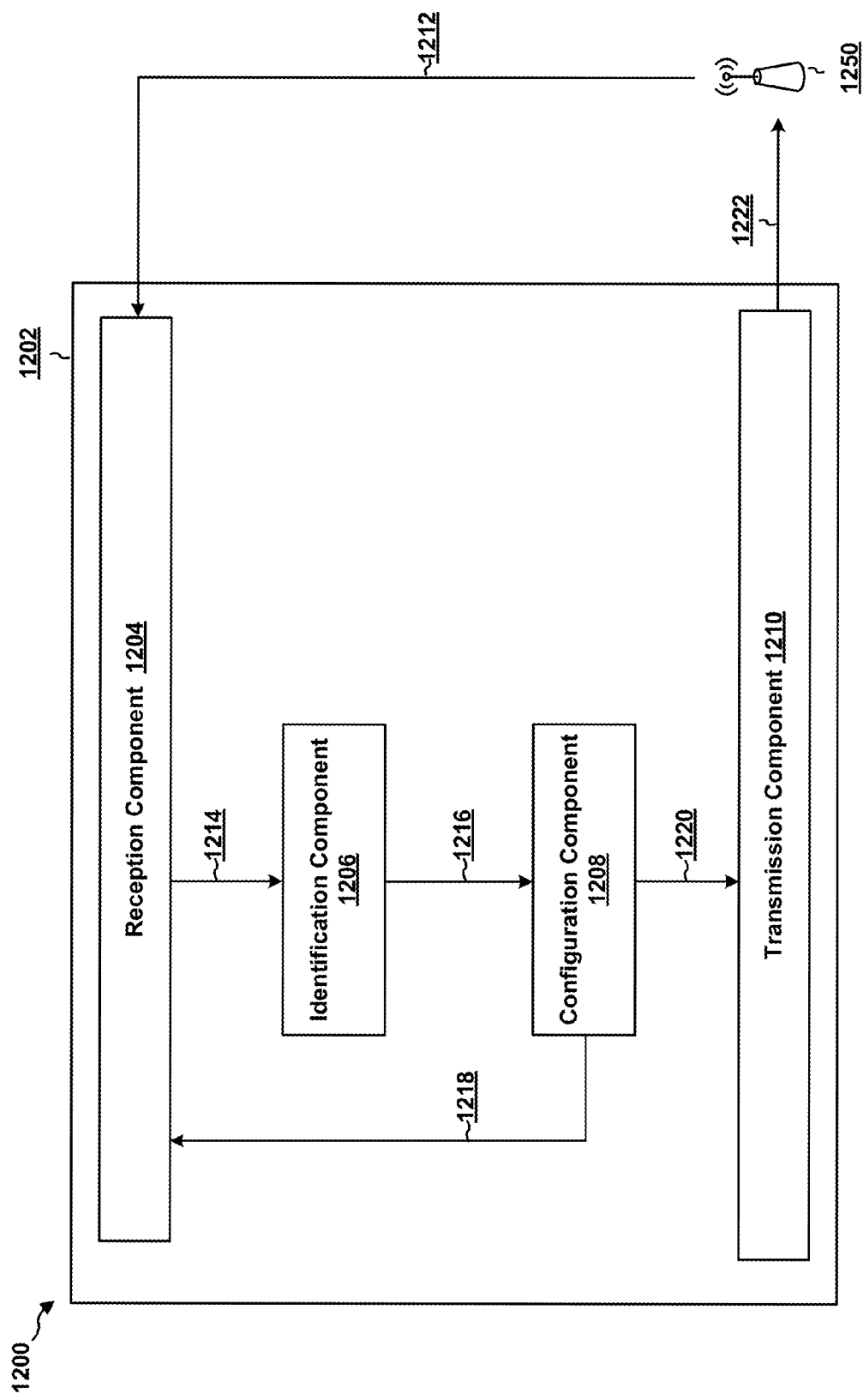
FIG. 12 is a conceptual data flow diagram illustrating data flow between different modules/means/components in an example apparatus.

FIG. 12 is a conceptual data flow diagram 1200 illustrating the data flow between different modules/means/components in an example apparatus 1202. In some aspects, the apparatus 1202 may be a UE (e.g., the UE 102, 206, 650, 802, 902, 1002). As shown, the apparatus 1202 may include a reception component 1204, an identification component 1206, a configuration component 1208, and a transmission component 1210.

The reception component 1204 may receive data 1212, which may include information from an eNB 1250 (e.g., which may correspond to one or more of the eNBs 106, 108 of FIG. 1, the eNBs 204, 208 of FIG. 2, the eNB 610 of FIG. 6, or the like). For example, the reception component 1204 may receive information described in connection with FIGS. 8A-11, such as signals received by one or more RX antennas (e.g., and used for channel quality measurements, scheduling measurements, identification of power consumption conditions, etc.). As shown, the reception component 1204 may provide data 1212 (e.g., which may be processed by the reception component 1204) as output to the identification component 1206 (e.g., as data 1214).

The identification component 1206 may receive data 1214 from the reception component 1204. Based at least in part on data 1214, the identification component 1206 may identify a power consumption condition that relates to a downlink channel associated with apparatus 1202. In some aspects, the identification component 1206 may provide data 1216 (e.g., processed data 1214) to the configuration component 1208, to permit the configuration component 1208 to configure one or more modems of apparatus 1202 based at least in part on the identification of the power consumption condition.

The configuration component 1208 may configure one or more modems based at least in part on the identified power consumption condition (e.g., indicated in data 1216). In some aspects, the configuration component 1208 may receive data 1216 from the identification component 1206. Additionally, or alternatively, the configuration component 1208 may provide data 1218 to reception component 1204 to configure the one or more modems (e.g., which may be included in reception component 1204). Additionally, or alternatively, the configuration component 1208 may provide data 1220 to the transmission component 1210. In some aspects, the data 1220 may identify the configuration of the one or more modems, and the transmission component 1210 may use data 1220 to interact with the eNB 1250 by transmitting data 1222 to the eNB 1250 (e.g., to notify the eNB 1250 of the configuration of the one or more modems of the UE, which may permit the eNB 1250 to modify a manner in which data is provided to the UE).

The apparatus 1202 may include additional components that perform each of the operations and blocks of the algorithm in the aforementioned examples and flow charts of FIGS. 8A-11. As such, each operation and block in the aforementioned examples and flow charts of FIGS. 8A-11 may be performed by a component, and the apparatus 1202 may include one or more of those components. The components may be one or more hardware components specifically configured to carry out the stated processes/algorithm, implemented by a processor configured to perform the stated processes/algorithm, stored within a non-transitory computer-readable medium for implementation by a processor, or some combination thereof.

Figure 13:
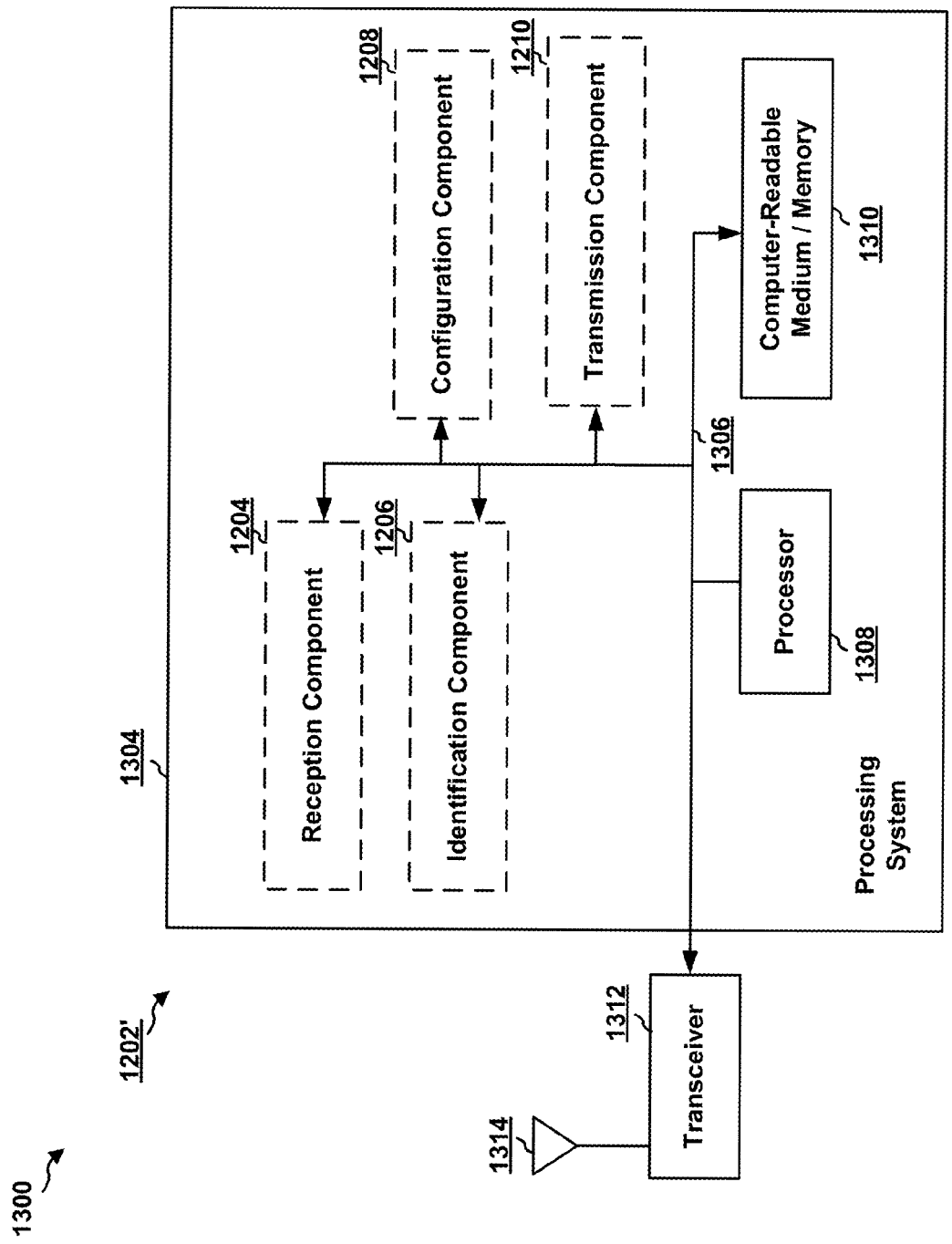
FIG. 13 is a diagram illustrating an example of a hardware implementation for an apparatus employing a processing system.

FIG. 13 is a diagram illustrating an example of a hardware implementation 1300 for an apparatus 1202' employing a processing system 1304. The processing system 1304 may be implemented with a bus architecture, represented generally by the bus 1306. The bus 1306 may include any number of interconnecting buses and bridges depending on the specific application of the processing system 1304 and the overall design constraints. The bus 1306 links together various circuits including one or more processors and/or hardware modules, represented by the processor 1308, the components 1204, 1206, 1208, 1210, and the computer-readable medium/memory 1310. The bus 1306 may also link various other circuits such as timing sources, peripherals, voltage regulators, and power management circuits, which are well known in the art, and therefore, will not be described any further.

The processing system 1304 may be coupled to a transceiver 1312. The transceiver 1312 is coupled to one or more antennas 1314 (e.g., which may include one or more RX antennas). The transceiver 1312 provides a means for communicating with various other apparatus over a transmission medium. The transceiver 1312 receives a signal from the one or more antennas 1314, extracts information from the received signal, and provides the extracted information to the processing system 1304, specifically the reception component 1204. In addition, the transceiver 1312 receives information from the processing system 1304, specifically the transmission component 1210, and based at least in part on the received information, generates a signal to be applied to the one or more antennas 1314. The processing system 1304 includes a processor 1308 coupled to a computer-readable medium/memory 1310. The processor 1308 is responsible for general processing, including the execution of software stored on the computer-readable medium/memory 1310. The software, when executed by the processor 1308, causes the processing system 1304 to perform the various functions described supra for any particular apparatus. The computer-readable medium/memory 1310 may also be used for storing data that is manipulated by the processor 1308 when executing software. The processing system further includes at least one of the components 1204, 1206, 1208, 1210. The components may be software modules running in the processor 1308, resident/stored in the computer readable medium/memory 1310, one or more hardware modules coupled to the processor 1308, or some combination thereof. The processing system 1304 may be a component of the UE 650 and may include the memory 660 and/or at least one of the TX processor 668, the RX processor 656, and the controller/processor 659.

In one configuration, the apparatus 1202/1202' for wireless communication includes means for identifying a power consumption condition that relates to a downlink channel associated with the UE, wherein the power consumption condition corresponds to a time period that is shorter than or equal to a TTI of the UE, means for configuring one or more modems of the UE to reduce power consumption during the time period, means for reducing a number of decoder iterations to be performed in the time period, means for reconfiguring a MIMO demodulator of the apparatus, means for deactivating one or more receiver chain components of the UE, means for reducing a number of iterations of an iterative MIMO demodulation and decoding receiver or a MIMO interference cancellation receiver, means for reducing or deactivating a multi-cell interference cancellation process, means for reducing or deactivating an advanced channel estimation mode, means for identifying one or more symbols or portions of a data unit to be processed in the time period and activating one or more receiver chains to receive the one or more symbols or portions of the data unit, means for identifying a prioritized channel or bearer to be processed in the time period and activating one or more receiver chains to process the prioritized channel or bearer, and/or the like. The aforementioned means may be one or more of the aforementioned modules of the apparatus 1202 and/or the processing system 1304 of the apparatus 1202' configured to perform the functions recited by the aforementioned means. As described supra, the processing system 1304 may include the TX processor 668, the RX processor 656, and the controller/processor 659. As such, in one configuration, the aforementioned means may be the TX processor 668, the RX processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication for a user equipment, comprising:
    identifying a power consumption condition that relates to a downlink channel associated with the user equipment, wherein the power consumption condition corresponds to a time period that is shorter than or equal to a transmission time interval (TTI) of the user equipment; and
    configuring one or more modems of the user equipment to reduce power consumption during the time period,
        wherein configuring the one or more modems comprises at least one of:
            reducing a number of decoder iterations to be performed in the time period,
            reducing a number of iterations of an iterative multiple-input multiple-output (MIMO) demodulation and decoding receiver or a MIMO interference cancellation receiver, or
            reducing or deactivating a multi-cell interference cancellation process.

2. The method of claim 1, wherein configuring the one or more modems comprises:
    reducing the number of decoder iterations to be performed in the time period.

3. The method of claim 1, wherein configuring the one or more modems further comprises:
    reconfiguring a MIMO demodulator of the user equipment.

4. The method of claim 1, wherein configuring the one or more modems comprises:
    reducing the number of iterations of the iterative MIMO demodulation and decoding receiver or the MIMO interference cancellation receiver.

5. The method of claim 1, wherein configuring the one or more modems comprises:
    reducing or deactivating the multi-cell interference cancellation process.

6. The method of claim 1, wherein configuring the one or more modems further comprises:
    reducing or deactivating an advanced channel estimation mode.

7. The method of claim 1, wherein identifying the power consumption condition comprises:
    identifying the power consumption condition based at least in part on a channel capacity parameter or a channel quality parameter of the downlink channel, wherein the channel capacity parameter or the channel quality parameter indicates that an actual channel capacity or an actual channel quality of the downlink channel exceeds a required channel capacity or a required channel quality of the downlink channel.

8. The method of claim 1, wherein configuring the one or more modems comprises:
deactivating a subset of one or more receiver chains of the user equipment.

9. The method of claim 1, wherein identifying the power consumption condition comprises:
identifying a prioritized channel or bearer to be processed in the time period.

10. A user equipment for wireless communication, comprising:
memory; and
one or more processors coupled to the memory, the memory and the one or more processors configured to:
identify a power consumption condition that relates to a downlink channel associated with the user equipment,
wherein the power consumption condition corresponds to a time period that is shorter than or equal to a transmission time interval (TTI) of the user equipment, and
wherein the memory and the one or more processors, when identifying the power consumption condition, are configured to one or more of:
identify a prioritized channel or bearer to be processed in the time period, or
identify the power consumption condition based at least in part on a channel capacity parameter or a channel quality parameter of the downlink channel; and
configure one or more modems of the user equipment to reduce power consumption during the time period.

11. The user equipment of claim 10, wherein the memory and the one or more processors, when configuring the one or more modems, are configured to:
reduce a number of decoder iterations to be performed in the time period.

12. The user equipment of claim 10, wherein the memory and the one or more processors, when configuring the one or more modems, are configured to:
reconfigure a multiple-input multiple-output (MIMO) demodulator of the user equipment.

13. The user equipment of claim 10, wherein the memory and the one or more processors, when configuring the one or more modems, are configured to:
reduce a number of iterations of an iterative multiple-input multiple-output (MIMO) demodulation and decoding receiver or a MIMO interference cancellation receiver.

14. The user equipment of claim 10, wherein the memory and the one or more processors, when configuring the one or more modems, are configured to:
reduce or deactivate a multi-cell interference cancellation process.

15. The user equipment of claim 10, wherein the memory and the one or more processors, when configuring the one or more modems, are configured to:
reduce or deactivate an advanced channel estimation mode.

16. The user equipment of claim 10, wherein the memory and the one or more processors, when identifying the power consumption condition, are configured to:
identify the power consumption condition based at least in part on the channel capacity parameter or the channel quality parameter of the downlink channel,
wherein the channel capacity parameter or the channel quality parameter indicates that an actual channel capacity or an actual channel quality of the downlink channel exceeds a required channel capacity or a required channel quality of the downlink channel.

17. An apparatus for wireless communication, comprising:
means for identifying a power consumption condition that relates to a downlink channel associated with the apparatus,
wherein the power consumption condition corresponds to a time period that is shorter than or equal to a transmission time interval (TTI) of the apparatus; and
means for configuring one or more modems of the apparatus to reduce power consumption during the time period,
wherein the means for configuring the one or more modems comprises at least one of:
means for reducing a number of decoder iterations to be performed in the time period,
means for reducing a number of iterations of an iterative multiple-input multiple-output (MIMO) demodulation and decoding receiver or a MIMO interference cancellation receiver, or
means for reducing or deactivating a multi-cell interference cancellation process.

18. The apparatus of claim 17, wherein the means for configuring the one or more modems comprises:
the means for reducing the number of decoder iterations to be performed in the time period.

19. The apparatus of claim 17, wherein the means for configuring the one or more modems further comprises:
means for reconfiguring a MIMO demodulator of the apparatus.

20. The apparatus of claim 17, wherein the means for configuring the one or more modems comprises:
the means for reducing the number of iterations of the iterative multiple-input multiple-output (MIMO) demodulation and decoding receiver or the MIMO interference cancellation receiver.

21. The apparatus of claim 17, wherein the means for configuring the one or more modems further comprises:
means for reducing or deactivating the multi-cell interference cancellation process.

22. The apparatus of claim 17, wherein the means for configuring the one or more modems further comprises:
means for reducing or deactivating an advanced channel estimation mode.

23. The apparatus of claim 17, wherein the means for identifying the power consumption condition comprises:
means for identifying a prioritized channel or bearer to be processed in the time period.

24. A non-transitory computer-readable medium storing one or more instructions for wireless communication, the one or more instructions comprising:
one or more instructions that, when executed by one or more processors of a user equipment, cause the one or more processors to:
identify a power consumption condition that relates to a downlink channel associated with the user equipment, wherein the power consumption condition corresponds to a time period that is shorter than or equal to a transmission time interval (TTI) of the user equipment, and wherein the one or more instructions, that cause the one or more processors to identify the power consumption condition, cause the one or more processors to one or more of:
- identify a prioritized channel or bearer to be processed in the time period, or
- identify the power consumption condition based at least in part on a channel capacity parameter or a channel quality parameter of the downlink channel; and configure one or more modems of the user equipment to reduce power consumption during the time period.

25. The non-transitory computer-readable medium of claim 24, wherein the one or more instructions, that cause the one or more processors to configure the one or more modems, cause the one or more processors to:
reduce a number of decoder iterations to be performed in the time period.

26. The non-transitory computer-readable medium of claim 24, wherein the one or more instructions, that cause the one or more processors to configure the one or more modems, cause the one or more processors to:
reconfigure a multiple-input multiple-output (MIMO) demodulator of the user equipment.

27. The non-transitory computer-readable medium of claim 24, wherein the one or more instructions, that cause the one or more processors to configure the one or more modems, cause the one or more processors to:
reduce a number of iterations of an iterative multiple-input multiple-output (MIMO) demodulation and decoding receiver or a MIMO interference cancellation receiver.

28. The non-transitory computer-readable medium of claim 24, wherein the one or more instructions, that cause the one or more processors to configure the one or more modems, cause the one or more processors to:
reduce or deactivate a multi-cell interference cancellation process.

29. The non-transitory computer-readable medium of claim 24, wherein the one or more instructions, that cause the one or more processors to configure the one or more modems, cause the one or more processors to:
reduce or deactivate an advanced channel estimation mode.

30. The non-transitory computer-readable medium of claim 24, wherein the one or more instructions, that cause the one or more processors to identify the power consumption condition, cause the one or more processors to:
identify the prioritized channel or bearer to be processed in the time period.

* * * * *